No. 718,855. PATENTED JAN. 20, 1903.
K. B. MILLER.
TELEPHONE SET.
APPLICATION FILED AUG. 23, 1901.
NO MODEL. 3 SHEETS—SHEET 2.
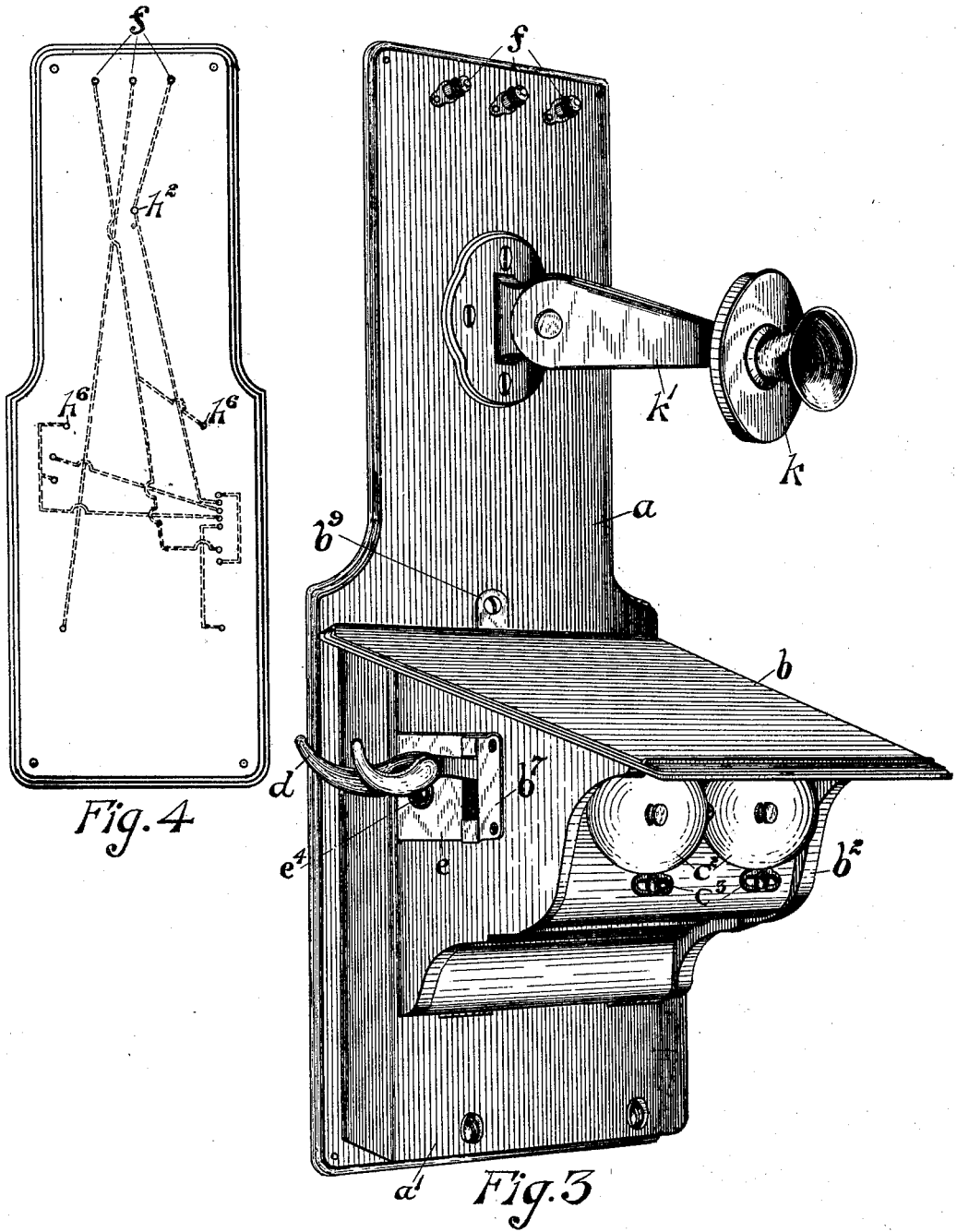

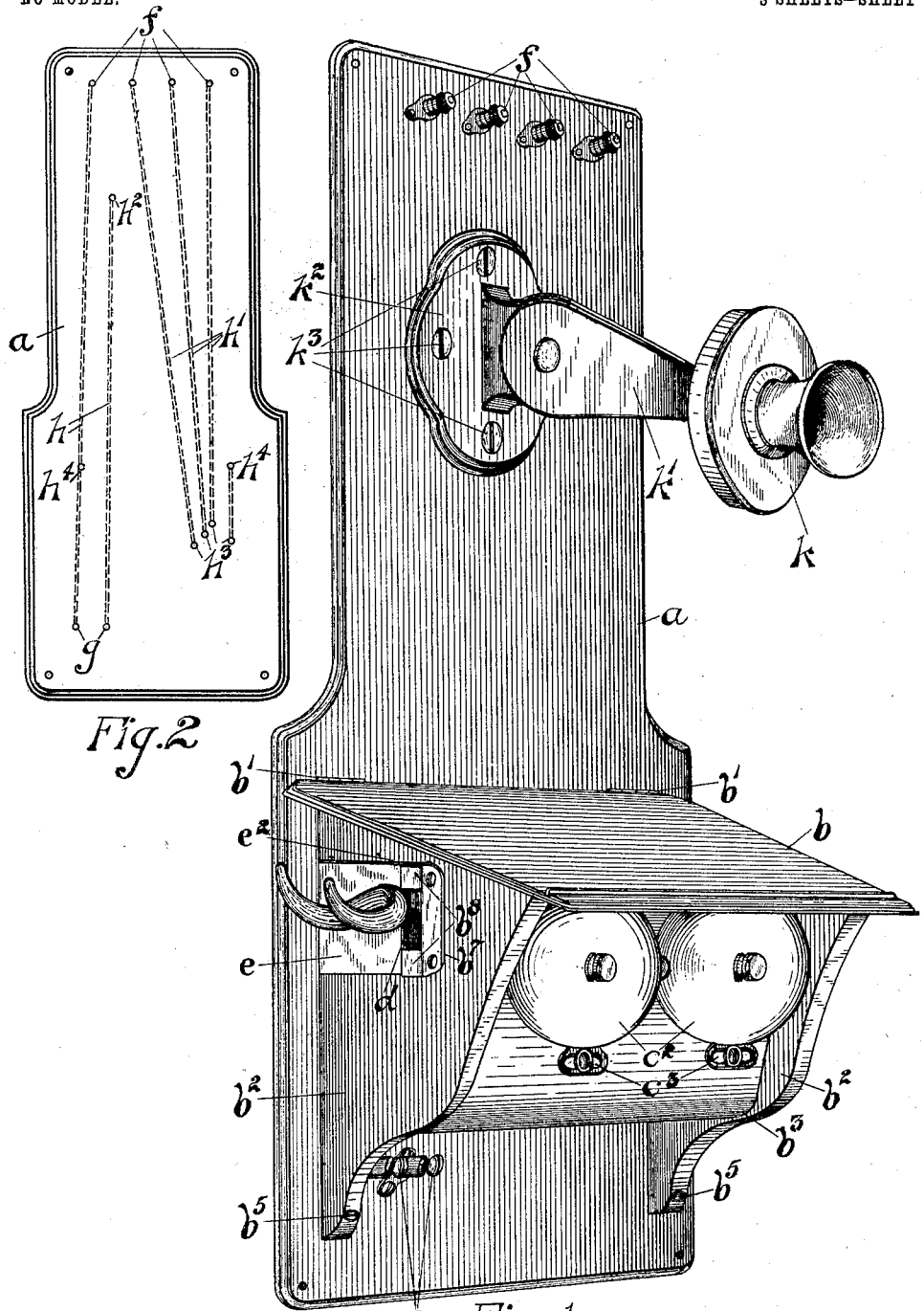

No. 718,855. PATENTED JAN. 20, 1903.
K. B. MILLER.
TELEPHONE SET.
APPLICATION FILED AUG. 23, 1901.
NO MODEL. 3 SHEETS—SHEET 3.
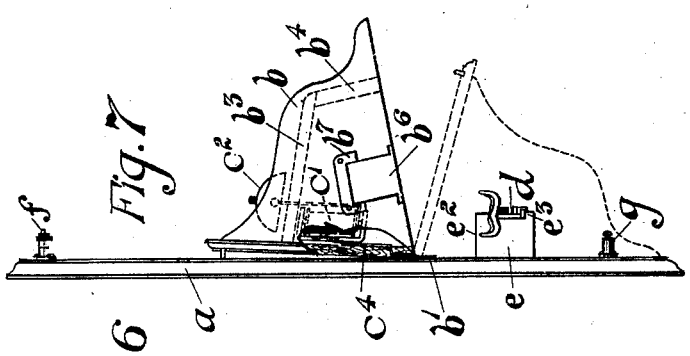
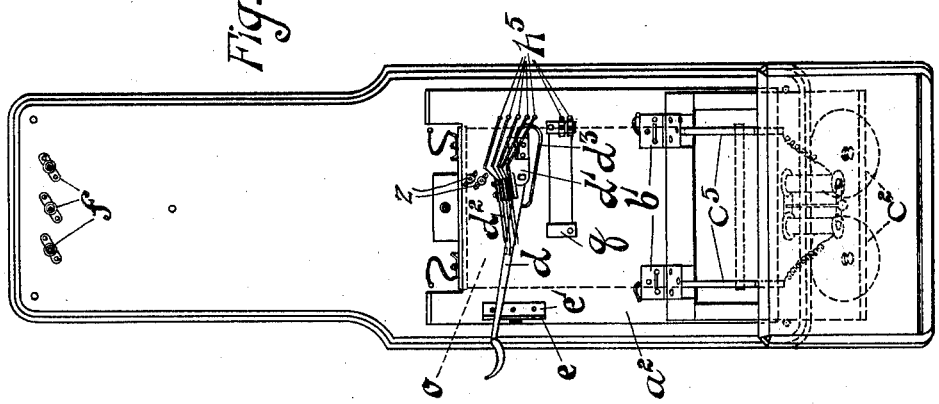
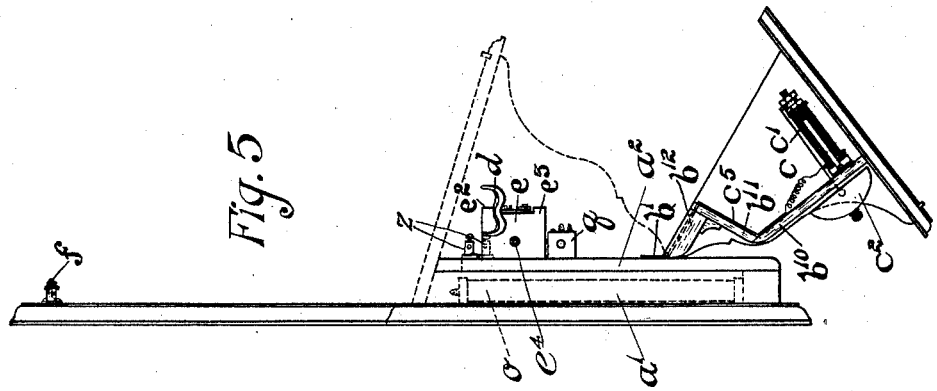

UNITED STATES PATENT OFFICE.

KEMPSTER B. MILLER, OF CHICAGO, ILLINOIS, ASSIGNOR TO KELLOGG SWITCHBOARD AND SUPPLY COMPANY, OF CHICAGO, ILLINOIS, A CORPORATION OF ILLINOIS.

TELEPHONE SET.

SPECIFICATION forming part of Letters Patent No. 718,855, dated January 20, 1903.

Application filed August 23, 1901. Serial No. 72,970. (No model.)

*To all whom it may concern:*

Be it known that I, KEMPSTER B. MILLER, a citizen of the United States of America, and a resident of Chicago, county of Cook, and State of Illinois, have invented a certain new and useful Improvement in Telephone Sets, of which the following is a specification.

My invention relates to improvements in telephone wall sets for use at subscribers' stations in telephone-exchanges, and has for its general objects the provision of an apparatus or instrument of the class described that is convenient to manufacture, inspect, or repair, that has few and simple parts, and one that is durable and efficient, as well as graceful in outline and pleasing in appearance, and comparatively inexpensive to construct.

One main object of the invention is to mount substantially all the apparatus upon the backboard of the instrument, so that the wiring and the several parts—such as the hook-switch, induction-coil, if any be used, and other parts—may all be compactly and conveniently placed thereon and secured in position, all joints soldered, and all parts adjusted before the usual cover or inclosing case is applied, whereby the manufacture of substantially the whole device is unhampered by adjacent parts of the set, the difficulty of securing and connecting up parts in the interior of a box-like cover or case is avoided, and the labor and expense of obtaining and maintaining the proper adjustment of the devices where their separate parts are mounted upon relatively movable parts is entirely dispensed with.

To the accomplishment of these objects and such others as may hereinafter appear the invention consists in the novel parts and combinations of parts hereinafter described, and particularly pointed out in the appended claims, reference being had to the accompanying drawings, forming a part hereof, in which the same reference characters designate like parts throughout the several views, and in which—

Figure 1 is a perspective view of one form of my invention. Fig. 2 is a front view of the backboard. Fig. 3 is a perspective view of another form. Fig. 4 is a front view of the backboard. Fig. 5 is a side view of the same, showing the box open for inspection or repairs. Fig. 6 is a front view of the set with the cover dropped; and Fig. 7 is a side view of the set of Fig. 1, also shown open.

In Figs. 1, 2, and 7 the letter $a$ indicates the backboard of the wall set, and $b$ the usual box, cover, or case, adapted to inclose the switching parts of the apparatus, the bell-magnets, and like parts. This box $b$ is hinged at its upper edge by the hinges $b'$ $b'$ to the backboard $a$ and is adapted to be raised, as shown in Fig. 7, to permit access to the parts beneath. The bell is mounted in the cover $b$, of which the magnets are seen at $c'$, Fig. 7, and the gongs at $c^2$, Figs. 1 and 7, the latter being adjustable, as shown by the slots $c^3$, Fig. 1. The magnet-coils $c'$ are electrically connected with the hinges $b'$ $b'$ by conductors $c^4$. The top of the box or cover comprises a sloping shelf upon which papers may handily be laid, while the sides $b^2$ of the same are preferably of bracket form, with curved front edges, as shown. The box is inclosed in front and bottom by the pieces $b^3$ and $b^4$, which may be of any outline desired. Screws $b^5$ $b^5$ may be inserted at the lower ends of the side pieces $b^2$ to secure the box in place. Within this box $b$ and upon the backboard $a$ the hook-switch $d$ is mounted. It is substantially like the one shown in Fig. 6, to which reference is made for a front view as it appears when installed in place. It is preferably of the type in which the lever is pivoted upon a base or standard $d'$, which likewise carries the switch-springs $d^2$ and a lifting-spring $d^3$ all in a compact structure; but it is obvious that other forms may be employed. The switch-springs are adapted to be operated by the vibration of the hook to change the circuits connected therewith from normal position when the bell alone is in operative condition to talking position, at which time the talking instruments are rendered operative. This hook-switch device is mounted directly upon the backboard, and an escutcheon-plate $e$, having a foot $e'$, Fig. 6, projects forward and preferably limits the vibration of the hook by its upper and lower lugs $e^2$ and $e^3$ and also serves to conceal the notch or recess $b^6$, cut in the box $b$ to accommodate these parts. A similar plate $b^7$ is carried by the box-like cover to protect the front edge of the notch and to present a neat and finished appearance, the end $b^8$ thereof fitting over the lugs $e^2$ and $e^3$ of the escutcheon $e$ when the box is closed. The particular set described is intended for use in a telephone system employing a central source of current and without an induction-coil; but if it be desired to use an induction-coil it is also mounted upon the backboard within the box. A transmitter $k$ is carried upon one end of an arm $k'$, which is pivoted at the other end upon a base or pedestal $k^2$, secured, as by screws $k^3$, near the upper end of the board $a$.

Suitable binding-posts are located at the upper end of the board $a$, as at $f$, while others are placed at the lower end, as at $g$. The wiring of the set is all upon the backboard and extends from one point to the other in grooves or kerfs $h\ h'$, formed in the rear face of the board, as indicated by dotted lines in Fig. 2. The wires in these grooves are connected with the binding-posts $f$ or $g$ with the transmitter $t$ through a suitable aperture or apertures $h^2$ in the board at the rear of the transmitter-base $k^2$ and with the hook-switch $d$ through holes $h^3$. When the hook is secured in place upon the board, the wires are brought through said apertures $h^3$ and soldered to the fixed ends of the switch-springs. The hinges $b'$ may be connected with the system through the apertures $h^4\ h^4$. The line conductors are adapted to be connected with certain of the binding-posts, while the receiver-cords may be engaged by posts $g$.

In manufacturing the set the several described parts may be mounted upon the backboard, as mentioned, and the same completely wired together, the joints soldered, and the parts fully adjusted, the whole being conveniently accomplished, since there is nothing but the flat board to work upon. The bell is secured in position in the box and the box thus secured to the backboard, the circuit of the bell being completed through the hinges $h'$. The notch or recess $b^6$ in the cover $b$ allows the cover to fit over the hook-lever, and the plates $e$ and $b^7$ form a complete escutcheon for the aperture. The set is now complete and ready for use without other adjustment. The box may be raised, as shown in Fig. 7, to permit inspection of the parts and to test or repair the same.

In the form of the invention shown in Figs. 3, 4, and 6 the same general plan of construction is followed. The backboard $a$, however, has a receptacle $a'$ formed thereon at its lower front portion, in which a condenser $o$ (indicated in dotted lines in Figs. 5 and 6) is adapted to be placed. This shallow receptacle is inclosed on all sides and has a flat front face $a^2$, of wood, upon which the switch-hook $d$ and plate $e$ are mounted, as before explained, and with its upper end notched or partially removed to accommodate the condenser connections. An induction-coil $q$ is likewise mounted upon the board $a^2$, and the box carrying the bell $e$ is constructed as before explained and hinged at its lower edge, whereby the same may drop, as shown in Figs. 5 and 6, to entirely expose the parts in the interior. In Fig. 5 one side of the box $b^2$ is removed to show the interior thereof. The box is inclosed between the side pieces $b^2$ by the pieces $b^{10}$, $b^{11}$, and $b^{12}$, which are curved and outwardly finished as desired to present an ornamental appearance. The slanting cover is extended sufficiently to also close the condenser-box $a'$. The bell-circuit is connected, as before, through the conductors $c^5$ and the hinges $b'\ b'$ of the box. A tongue or clip $b^9$, with an inserted screw, holds the box upright. The cover fits over the hook $d$ and other parts as in the other form, the escutcheon being formed of the plates $e$ and $b^7$. A transmitter $k$ and arm $k'$ are carried by the backboard near its upper end.

Fig. 4 indicates the method of wiring the set, the conductors being placed in grooves in the back of the board and being connected with the several binding-posts, such as $f$, near the top of the board and with the transmitter-arm through aperture $h^2$. In order to bring them out in front to the hook-switch and other parts, they are extended through apertures, such as $h^5$, Fig. 6, in the edge pieces of the receptacle $a'$, though they may be brought through in other ways, the only consideration being that they shall not interfere with the condenser $o$. The receiver-cord is adapted to be attached to binding-posts $z$ in the interior of the box, and it extends through aperture $e^4$, Figs. 3 and 5, in the escutcheon-plate $e$, said aperture being bushed with insulation, as shown in Fig. 3, to prevent wear upon the receiver-cords and, further, to prevent short-circuiting the wires in the cords in case such wear takes place.

The wiring may of course be varied according to the particular system of circuits employed. The condenser-wires are conveniently led through apertures $h^6$, while the other connections are suitably disposed, the lower apertures being provided for the hinge-conductors.

By the term "backboard" I have in mind the usual shop significance—that is, meaning either the board forming the back of the set or the board together with all parts permanently attached thereto, such as the condenser-box, when it is desired to use a condenser.

From the foregoing it will be apparent that an efficient, durable, and simple subscriber's wall set is produced and that it is convenient to manufacture and is accessible for purposes of inspection and repair. It will also be apparent to those skilled in the art that various embodiments of the invention may be made and not depart from its scope or principle, and I therefore do not wish to be limited to the specific construction shown; but What I do claim, and desire to secure by Letters Patent, is—

1. In a telephone wall set, the combination with a backboard, of a condenser-receptacle, a hook-switch mounted upon the front wall of the receptacle, and a bodily-removable inclosing box comprising a top piece, side and front pieces, the said box being arranged in its closed position to inclose the said switch and to close said receptacle and when opened to entirely expose said switch and to open said receptacle, substantially as described.

2. In a telephone wall set, the combination with a backboard, of a condenser-receptacle formed thereon and having an opening at its upper end, a hook-switch comprising a pivoted hook-lever and a set of switch-springs controlled thereby mounted upon the front wall of said condenser-receptacle, a cover consisting of a box having a top, side and front pieces hinged at one edge and arranged when closed to fit over and inclose said switch and to close said condenser-receptacle and when open to entirely expose said switch and open said receptacle, substantially as described.

3. In a telephone wall set, the combination with a backboard, of a condenser-box carried upon the front face of the same, a hook-switch, and a bodily-removable box-like cover for the switch and box, substantially as described.

4. In a telephone wall set, the combination with a backboard, of a condenser-receptacle carried upon the front face of said backboard, operative parts of the telephone set mounted upon the front wall of said receptacle, permanent electric conductors mounted in grooves in the back face of the backboard and extending forward through suitable apertures in the backboard and through the edges of the condenser-receptacle so as to be concealed from the outside of the set and not to interfere with the space for the condenser within the box, said conductors serving to connect said parts in the electric circuit of the set, and a bodily-removable inclosing box forming a cover for said parts and secured to said front wall of the receptacle to inclose and protect said parts when the cover is in normal position and to close said receptacle, substantially as described.

5. In a telephone wall set, the combination with a backboard, of a shallow condenser-box carried on the front face of the same, a hook-switch mounted upon the said box, and an inclosing bodily-removable box-like cover adapted when in normal position to inclose the working parts of said switch and to close said condenser-box, substantially as described.

6. In a telephone wall set, the combination with a backboard, of a shallow box or receptacle carried upon the front face of the backboard and adapted to receive a condenser, a hook-switch comprising a standard mounted upon said box or receptacle, a pivoted lever upon the standard, and switch-springs also carried by the standard, electric conductors carried by the backboard and permanently connecting the terminals of the set with the switch-springs, and an inclosing bodily-removable box-like cover hinged to said box and adapted when in normal position to inclose the working parts of said switch and to close said condenser box or receptacle, substantially as described.

7. In a telephone wall set, the combination with a backboard, of a condenser-box carried on the front face of the same, a hook-switch mounted upon said box and comprising a pivoted lever and switch-springs adapted to be operated by the lever, electric conductors to permanently connect the connection-terminals of the set with the switch-springs, and a bodily-removable inclosing box-like cover adapted to be secured to the said box over the switching parts, substantially as described.

8. In a telephone wall set, the combination with a backboard, of a condenser-box carried on the front face of the same, a hook-switch mounted upon said box and comprising a pivoted lever and switch-springs adapted to be operated by the lever, electric conductors carried in grooves in the back face of the backboard, said conductors being brought forward through apertures in the backboard and at the edge of the condenser-box to the rigid terminals of the said springs to permanently connect the connection-terminals of the set with switch-springs and without extending through the condenser-box so as to interfere with placing the condenser therein, a bodily-removable box-like inclosing cover secured to said condenser-box over the switching parts and arranged to also close said condenser-box, substantially as described.

9. In a telephone wall set, the combination with a backboard, of a shallow condenser-box carried at the lower end of the backboard and nearly the width of the same, said box being closed upon the two sides and bottom and having a front plate parallel with the backboard, said condenser-box being of a suitable size to receive the flat rectangular condenser of the set, a hook-switch, a bodily-removable box-like inclosing cover consisting of a sloping top and bracket-shaped sides hinged at its lower edge to said front plate, said sides of the cover fitting closely at their inner edges against the said front plate when the cover is closed and the said sloping top extending rearwardly sufficient to cover said condenser-box, the sides of the condenser-box reaching up to and fitting said top when the cover is closed, one of the sides of the cover being notched to accommodate the vibrating lever of the hook-switch and permit the ready opening and closing of the cover, and a suitable call-bell mounted upon said cover with its magnets upon the inside of the same and the gongs outside thereof, substantially as described.

10. In a telephone wall set, the combination with a backboard designed to carry the other parts of the set, of a transmitter-arm and transmitter thereon carried upon the upper portion of the backboard, a shallow condenser-box formed at the lower end of the backboard and taking up substantially the whole lower portion of the same and designed to accommodate the flat rectangular condenser of the set, said box being open at its upper end and having a front plate substantially parallel with the backboard, a hook-switch mounted upon said front plate and comprising a pivoted hook-lever and switch-springs operated thereby, a bodily-removable box-like cover hinged to said front plate, said cover serving when closed to cover said condenser-box and the working parts of said switch, a notch formed in one edge of said cover to accommodate said lever and to permit opening and closing the cover without hindrance from the lever, an escutcheon-plate mounted upon said front plate and serving to conceal the said notch when the cover is closed, a call-bell mounted upon said cover with its operating-magnets inside thereof, concealed electric conductors permanently mounted upon the backboard and front plate to suitably connect said bell, switch and transmitter in the circuit of the set and without interfering with the space for the condenser in the said condenser-box, substantially as described.

11. In a telephone wall set, the combination with a backboard designed to carry the other parts of the set, of a transmitter-arm and transmitter thereon carried at the upper end of the backboard, a hook-switch mounted upon said backboard and comprising a pivoted hook-lever and switch-springs operated thereby, a self-contained bodily-removable cover having a sloping top and bracket-shaped sides rigidly secured together and hinged at one edge to said front plate, a notch formed in one of the sides of said cover to fit over the vibrating lever of the hook-switch, an escutcheon-plate mounted upon the backboard to coöperate with said notch and conceal the same when the cover is closed, said hook-switch being mounted upon the backboard independent of the escutcheon-plate, a call-bell mounted upon the inset front face of said removable cover with its gongs beneath the overhanging edge of the sloping top and between the said sides and its operating-magnets inside the cover, concealed electric conductors permanently mounted upon the backboard to suitably connect the various parts in the electrical circuit of the set, the sloping top of the cover forming a handy ledge or top for writing or other purposes and the whole forming a simple and compact telephone set, substantially as described.

12. In a telephone wall set, the combination with a backboard designed to carry the other parts of the set, a transmitter-arm and transmitter thereon carried at the upper end of the backboard, a condenser-box at the lower end of the backboard, a hook-switch mounted upon said box and comprising a pivoted hook-lever and switch-springs operated thereby, a self-contained box-like cover having a sloping top and bracket-shaped sides rigidly secured together, said cover being hinged at its lower edge to said front plate, a notch formed in one of the sides of said cover to fit over the movable lever of the hook-switch, an escutcheon-plate mounted upon the backboard to coöperate with said notch and conceal the same when the cover is closed, a metallic clip carried at the upper edge of the box by means of which the cover may be secured to the backboard in closed position, a call-bell mounted upon the inset front piece of said cover beneath the overhanging outer edge of the sloping top thereof and between its sides, concealed electric conductors permanently mounted upon the backboard to suitably connect the various parts in the electric circuit of the set, the sloping top of the cover forming a handy ledge or rest for writing or other purpose and the whole forming a compact and simple telephone set, substantially as described.

13. In a telephone wall set, the combination with a backboard designed to carry the other parts of the set, of a transmitter-arm and transmitter thereon carried upon the upper portion of the backboard, a shallow condenser-box formed upon the lower portion of said backboard and designed to accommodate the flat rectangular condenser of the set, said box being open at its upper end to permit insertion of the said condenser and having a front plate substantially parallel with the backboard, a hook-switch mounted upon said front plate and comprising a pivoted hook-lever and switch-springs operated thereby, an escutcheon-plate also carried by said front plate, a coil also mounted upon said front plate, a box-like cover hinged at its lower edge to said front plate and having means to secure the same in closed position, the inner edge of the top of said cover projecting rearwardly sufficient to close the condenser-box when the cover is closed, a call-bell mounted upon said cover, main-line terminals carried upon the backboard, concealed electric conductors permanently mounted upon said backboard and front plate to suitably connect said terminals, the switch, coil, bell and transmitter in the electric circuit of the set, an aperture in said escutcheon-plate through which the receiver-cord is carried from the receiver of the set on the outside of the cover to suitable connections within the same, a notch formed in the inner edge of one of the sides of the cover to accommodate the extended end of the hook-lever, said notch being concealed at its inner portion when the cover is closed by the said escutcheon-plate mounted upon the backboard, a metallic strip coöperating with said escutcheon-plate upon the other side of said lever when the cover is closed to conceal the outer portion of said notch, the inner edges of the sides of the said cover fitting closely against the front plate when the cover is closed so as to inclose the said switch, the coil, and the receiver-cord connections, said cover when open and dropped down serving to entirely expose the said switch and other adjacent parts upon the backboard for ready inspection and repair, and the said notch serving to permit the opening and closing of the cover without hindrance from the hook-lever or receiver-cord, substantially as described.

14. In a telephone wall set, the combination with a backboard having a narrowed upper portion and a wider lower portion designed to carry the other parts of the set, of a transmitter-arm and transmitter thereon carried upon the said upper portion, a shallow condenser-box formed upon the said lower portion of said backboard and designed to accommodate the flat rectangular condenser of the set, said box being open at its upper end and having a front plate substantially parallel with said backboard, said plate having a portion removed at its upper end to accommodate the condenser connections, a hook-switch mounted upon said front plate and comprising a pivoted hook-lever and switch-springs operated thereby, an escutcheon-plate also carried by said front plate and serving to limit the movement of the hook-lever, a coil mounted upon said front plate, a self-contained box-like cover having a sloping top and bracket-shaped sides and front hinged at its lower edge to said front plate, the inner edge of said top projecting rearwardly beyond the said sides, a call-bell carried upon the front of said cover beneath the overhanging edge of the said top and between the said sides, receiver-terminals carried upon front plate, binding-posts at the upper end of said backboard, concealed electrical conductors permanently mounted upon said backboard and front plate to suitably connect said terminals, the switch, coil, bell, and transmitter with said binding-posts in the electric circuit of the set, the bell-circuit being extended from the said plate to the cover by the hinges of the cover, an aperture in said escutcheon-plate through which the receiver-cord is carried from the receiver of the set on the outside of the cover to the said terminals within the same, said aperture having an insulating-bushing, a notch formed in the inner edge of one of the bracket-shaped sides of said cover to accommodate the extended end of the hook-lever and the escutcheon-plate, the strip $b^7$ having the projecting ends $b^8$ carried by the cover, the inner edges of the sides of said cover fitting closely against said front plate when the cover is closed so as to inclose said switch, terminals and coil, and the said rearwardly-projecting edge of the top fitting over and serving to cover the said upper end of the condenser-receptacle, a clip carried by the said inner edge of the cover by which the cover is secured in closed position, said cover when open and dropped down serving to entirely expose the said parts for ready inspection and repair, the said notch serving to permit the opening or closing of the cover without hindrance from the hook-lever or receiver-cord, and the sloping top of the cover forming a handy ledge or rest for writing or other purposes, substantially as described.

15. In a telephone wall set, the combination with a backboard, of a hook-switch directly mounted upon said backboard and comprising a pivoted hook-lever and a set of switch-springs operated thereby, an inclosing box-like cover removably secured to said backboard over the working parts of said switch and having a notch in its inner edge to accommodate the free end of said lever to permit the ready opening or closing of the said box or cover, and an escutcheon-plate mounted upon the backboard independent of the hook-switch and serving to conceal the said notch when the cover is in its closed position, substantially as described.

16. In a telephone wall set, the combination with a backboard, of a hook-switch mounted upon said backboard and comprising a pivoted hook-lever and a set of switch-springs operated thereby, an inclosing box-like cover removably secured to said backboard over the working parts of said switch and having a notch in its inner edge to accommodate the free end of said lever to permit the ready opening or closing of the said box or cover, an escutcheon-plate carried by the backboard and serving to conceal the inner portion of the said notch when the cover is closed, and a second plate secured to the cover at the front edge of the said notch and coöperating with the said plate when the cover is closed to surround said lever with a metallic escutcheon to conceal the said notch and to leave a close-fitting slot to permit the vibration of the lever, substantially as described.

17. In a telephone wall set, the combination with a backboard, of a hook-switch mounted thereon and comprising a long pivoted hook-lever and a set of switch-contacts operated thereby, a box-like cover hinged at its lower edge to said backboard and arranged in its closed position to inclose the working parts of said switch and in its open position to entirely expose the same, a notch in the inner edge of one side of said cover to fit over the hook-lever when the cover is closed and serving to permit the ready opening of the cover, an escutcheon-plate carried by the backboard and arranged to coöperate with the notch when the cover is closed, the mounting of the said hook-switch upon the backboard being independent of the said escutcheon-plate, a bell mounted upon the cover with its magnets inside and suitably connected in the circuit of the set, and a metallic clip secured to the inner edge of the top of the cover and projecting above the same, and means to secure said projecting end of the clip to the backboard to secure the said cover in closed position.

18. In a telephone wall set, the combination with a backboard, of a hook-lever mounted upon said backboard, an escutcheon-plate for said lever also mounted upon said backboard, and an aperture through said plate for the passage of the receiver-cord, substantially as described.

19. In a telephone wall set, the combination with a backboard, of a hook-lever mounted upon said backboard, an escutcheon-plate for said lever also mounted upon said backboard, said plate having an aperture for the passage of the receiver-cord, and a bushing about said aperture to prevent wearing the covering of the cord, substantially as described.

20. In a telephone wall set, the combination with a backboard, of a hook-lever mounted upon said backboard, an escutcheon-plate for said lever having an aperture therethrough for the passage of the receiver-cord, and an insulating-bushing for said aperture designed to prevent undue wear upon the covering of the receiver-cord and to prevent short-circuiting the conductors of said cord in case the covering becomes worn away, substantially as described.

21. In a telephone wall set, the combination with a backboard, of a hook-lever mounted upon said backboard, an escutcheon-plate for said lever mounted upon the backboard, said plate having an aperture for the passage of the receiver-cord, and an inclosing box-like cover hinged to said backboard and having a notch in its edge coöperating with the escutcheon-plate to permit the opening of the box or cover and the movement of the lever, substantially as described.

22. In a telephone wall set, the combination with a backboard, of a hook-switch having a hook-lever mounted upon said backboard, an escutcheon-plate for said lever also mounted upon said backboard, said escutcheon-plate having lugs extending above and below said lever to limit its vibration and an aperture for the passage of the receiver-cord, and a bodily-removable box-like cover to fit over said switch, said cover having a notch in its edge for said lever and escutcheon-plate, substantially as described.

23. In a telephone wall set, the combination with a backboard, of a hook-lever mounted upon said backboard, an escutcheon-plate for said lever mounted upon the backboard, said plate having an aperture for the passage of the receiver-cord, said aperture being bushed to prevent wear upon the cord, and an inclosing box secured to said backboard over the switch and having a notch in its edge coöperating with the escutcheon-plate to permit the opening of the box without disturbing the lever and the escutcheon-plate serving when the box is closed to conceal the said notch, substantially as described.

24. In a telephone set, the combination with a backboard, a pivoted lever mounted upon the backboard and adapted to control the circuit through the set, an escutcheon-plate mounted near the free end of the lever and upon the backboard to limit the vibration thereof, an inclosing box-like cover hinged to the backboard and adapted to cover the main part of said lever and having a notch or recess formed in one edge to accommodate the free end of the lever and the escutcheon-plate, and the plate $b^7$ secured to said cover at the edge of said recess and having lugs adapted to fit over corresponding portions of the escutcheon-plate when the box is closed, substantially as described.

Signed by me at Chicago, county of Cook, and State of Illinois, this 19th day of August, 1901.

KEMPSTER B. MILLER.

Witnesses:
J. C. BELDEN,
ROBERT LEWIS AMES.